(12) United States Patent
Stauffer et al.

(10) Patent No.: US 11,358,810 B2
(45) Date of Patent: Jun. 14, 2022

(54) TOOLING FOR PICKING UP TWO-DIMENSIONAL WORKPIECES

(71) Applicant: Güdel AG, Langenthal (CH)

(72) Inventors: Adrian Stauffer, Langenthal (CH); Markus Gerber, Niederönz (CH); Lukas Müller, Thun (CH)

(73) Assignee: Güdel AG, Langenthal (CH)

( * ) Notice: Subject to any disclaimer, the term of this patent is extended or adjusted under 35 U.S.C. 154(b) by 0 days.

(21) Appl. No.: 16/976,682

(22) PCT Filed: Mar. 1, 2018

(86) PCT No.: PCT/EP2018/055098
§ 371 (c)(1),
(2) Date: Aug. 28, 2020

(87) PCT Pub. No.: WO2019/166097
PCT Pub. Date: Sep. 6, 2019

(65) Prior Publication Data
US 2021/0002086 A1 Jan. 7, 2021

(51) Int. Cl.
*B65G 47/91* (2006.01)
(52) U.S. Cl.
CPC .................. *B65G 47/918* (2013.01)
(58) Field of Classification Search
None
See application file for complete search history.

(56) References Cited

U.S. PATENT DOCUMENTS

| | | |
|---|---|---|
| 2009/0194922 A1 | 8/2009 | Lin et al. |
| 2014/0356049 A1 | 12/2014 | Lin et al. |

(Continued)

FOREIGN PATENT DOCUMENTS

| | | | | |
|---|---|---|---|---|
| DE | 10 2006 017 763 A1 | 10/2007 | | |
| DE | 102006017763 A1 | * 10/2007 | ........... | B66C 1/0212 |

(Continued)

OTHER PUBLICATIONS

International Search Report from International Application No. PCT/EP2018/055098, dated Nov. 30, 2018.

(Continued)

*Primary Examiner* — Gerald McClain
(74) *Attorney, Agent, or Firm* — Davidson, Davidson & Kappel, LLC

(57) ABSTRACT

Tooling (100) for picking up two-dimensional workpieces comprises a main body (110) and a plurality of holding elements (131, 132) arranged on the main body (110), wherein the holding elements (131, 132) are movable relative to the main body (110) independently of one another. Each of the holding elements (131, 132) is fastened in an end region of an arm (121.1 ... 10, 122.1 ... 10). The arms (121, 122) are movable passively relative to the main body (110) along a linear movement path in a longitudinal extension of each particular arm (121, 122). The tooling (100) comprises, for each of the arms (121, 122) a fixing apparatus, by means of which a position of each particular arm (121, 122) along the movement path is fixable. On account of its passive character, the tooling (100) according to the invention is lightweight and can be produced cost-effectively. Compared with fixedly configured tooling, reduced costs arise on account of the configurability, because different types of tooling do not have to be kept available and provided. The storage area for replacement tooling is saved, and also an automatic tooling changing station or a manual tooling change become superfluous. As a result of the geometry according to the invention, the tooling (100) can be set easily, no complex movements and accordingly no complicated setting devices (for example multiaxial robots) are necessary.

18 Claims, 11 Drawing Sheets

(56) References Cited

U.S. PATENT DOCUMENTS

| | | | |
|---|---|---|---|
| 2015/0071740 A1* | 3/2015 | Fujii | B23Q 7/003 414/222.08 |
| 2017/0152115 A1* | 6/2017 | Montoya | B25J 19/023 |
| 2018/0281316 A1* | 10/2018 | Foley | B29C 64/20 |

FOREIGN PATENT DOCUMENTS

| | | | | |
|---|---|---|---|---|
| DE | 10 2013 105 383 B3 | 7/2014 | | |
| DE | 102013105383 B3 * | 7/2014 | | B65G 49/067 |
| DE | 10 2014 107 533 A1 | 12/2014 | | |
| JP | H11-123685 A | 5/1999 | | |
| KR | 10-2016-0101630 A | 8/2016 | | |

OTHER PUBLICATIONS

Office Action from Korean Patent Application No. 9-5-2021-091015768, dated Nov. 19, 2021.

\* cited by examiner

TOOLING FOR PICKING UP TWO-DIMENSIONAL WORKPIECES

This application is a U.S. national phase application under 35 U.S.C. of § 371 of International Application No. PCT/EP 2018/055098, filed Mar. 1, 2018, the disclosures of which are all hereby incorporated by reference herein.

TECHNICAL FIELD

The invention relates to a tooling for picking up two-dimensional workpieces, wherein the tooling comprises a main body and a plurality of holding elements arranged on the main body. The holding elements are movable relative to the main body independently of one another, wherein each of the holding elements is fastened in an end region of an arm. The invention further relates to a system for processing two-dimensional workpieces, comprising a transport device, wherein such a tooling is fastened to the transport device. The invention further relates to a method for processing two-dimensional workpieces.

PRIOR ART

In systems for the automated processing of two-dimensional workpieces, such as for example plates made of sheet metal in a press line, so-called toolings are often used for picking up, holding and releasing workpieces. In this case, the toolings are picking-up members which have a plurality of holding devices which are simultaneously able to be brought into contact at a plurality of points with the two-dimensional workpiece and selectively able to secure said two-dimensional workpiece. The tooling is held on a transport device and is moved thereby to predetermined positions and into predetermined orientations, so that the workpiece may be transported and positioned for processing operations.

The configuration of the tooling which is used, namely that which relates to the number and the positioning of the holding devices, generally has to be adapted to the workpieces to be transported. To this end, different toolings may be used for different workpieces, said toolings being attachable to the transport device, for example, by means of a quick coupling device, so that if required they may be rapidly replaced. Instead of providing separate specific toolings for all of the workpieces, toolings which are reconfigurable may be also used. Conventionally, the reconfiguration is carried out manually, for example, an operator moves holding devices which are arranged on the tooling or replaces parts of the tooling.

Within the context of a production which is as fully automated as possible, it is advantageous if the reconfiguration is able to take place automatically. Corresponding toolings and systems are known from the prior art.

Thus DE 10 2013 105 383 B3 (Schindler Handhabetechnik GmbH) discloses a device for the pneumatic holding and lifting of glass plates. The corresponding tooling has at least two telescopic transverse support beams with at least two telescopic members which are movable relative to one another by a transverse support beam drive. In each case at least one suction cup is fastened to the telescopic members of the individual transverse support beams as a holding element. Thus by means of the transverse support beam drives it is possible to alter the respective transverse support beam in terms of its length and at the same time to alter the spacing of the suction cups fastened to this transverse support beam. The transverse support beam drives are arranged on the tooling and may be formed by linear motors. Preferably, the drives are formed in each case by a pneumatic cylinder and by transmission gears on the individual telescopic members.

The corresponding tooling with the telescopic transverse support beams and the corresponding transverse support beam drives is of relatively complex construction and has a correspondingly high weight. This leads to higher forces and/or impaired dynamics during operation, in comparison with specifically assembled toolings. When handling relatively heavy glass plates, this is not necessarily of any consequence, but if more lightweight workpieces are intended to be processed a heavy tooling is a drawback.

DE 10 2014 107 533 B4 (GM Global Technology Operations LLC) relates to a reconfigurable picking-up member arrangement with a main beam, a member which is arranged at right-angles relative to the main beam and which is rigidly connected to one end of the main beam, with a plurality of branches which extend radially outwardly from the member, as well as a plurality of tandem branch connection arrangements which in each case connect at least two of the branches to the member. The tandem branch connection arrangements comprise first and second branch connections, each thereof comprising a releasable holding cam. Tool modules are correspondingly mounted in each case on one of the branches and selectively movable and rotatable relative thereto. The tandem branch connection arrangements are in each case rotatable and movable relative to a longitudinal axis of the member when the holding cam is released. Thus the configuration of the picking-up member arrangement may be adapted to the construction of a workpiece to be picked up. Actuators for releasing the holding cams may be part of a configuration tool which is moved by a robot into an interactive position with a specific holding cam.

By the arrangement of the actuators separately from the tooling, the tooling may be configured to be more lightweight, which reduces the forces on a transport device for the tooling and/or permits higher dynamics. The configuration of this tooling with the branches and the rotatable and movable tandem branch connection arrangements, however, is relatively complex and requires a robot with several degrees of freedom for positioning the configuration tool. For reconfiguring the tooling, the configuration tool has to be successively moved to all of the holding cams which takes a certain amount of time.

DESCRIPTION OF THE INVENTION

It is the object of the invention to provide a tooling belonging to the aforementioned technical field which is automatically configurable in a simple and rapid manner and which has a low weight.

The solution of the object is defined by the features of claim 1. According to the invention the arms are movable passively relative to the main body along a linear movement path in a longitudinal extension of each particular arm, and the tooling comprises, for each of the arms a fixing apparatus, by means of which a position of each particular arm along the movement path is fixable.

The movement of the arms is thus possible when the fixing apparatus assigned to an arm is released. A drive arranged on the tooling is not required therefor but the respective arm is passive and may be moved relative to the main body by externally acting corresponding movement forces. The fixing of the arm may be carried out by positive and/or non-positive means. The arm is thus secured (or fixed) when its position relative to the main body does not alter in the case of maximum anticipated forces acting thereon during operation.

The fixing apparatuses for the individual arms may be actuatable individually, only together or in groups. To this end, a plurality of fixing apparatuses may be coupled together mechanically, pneumatically, hydraulically or electrically. A one-piece configuration of a plurality of (or all) fixing apparatuses is also possible.

The fastening of a holding element to an end region of a corresponding arm may be carried out on the front face on the arm, i.e. on the free end itself. However, it may also be carried out laterally on the arm. The end region of the arm adjoins the free end of the arm which is remote from the main body along the movement path when the arm is extended. The position in the end region is selected such that with a movement along the movement path, from one end position to the other, at least the required adjustment path of the holding element is achieved. In order to permit a narrow design of the tooling in the transverse direction, the extension of the end region along the movement path is preferably a maximum of 20% of the distance of the free end of the arm from the facing side of the main body when the arm is fully extended.

The arm, in particular, is an elongated, straight element with a uniform cross section. The cross section may be a regular polygon but a round cross section or an irregular cross-sectional shape are also possible.

On account of its passive character, the tooling according to the invention is lightweight and can be produced cost-effectively. Compared with fixedly configured tooling, reduced costs arise on account of the configurability, because different types of tooling do not have to be kept available and provided. The storage area for replacement tooling is saved, and also an automatic tooling changing station or a manual tooling change become superfluous. As a result of the geometry according to the invention, the tooling can be set easily, no complex movements and accordingly no complicated setting devices (for example multiaxial robots) are necessary.

The holding elements, in particular, are vacuum suction cups. These vacuum suction cups are well-suited for holding two-dimensional workpieces and the holding force may be selectively regulated and/or switched on or off pneumatically. Alternatively or additionally, the invention is implemented with magnetic and/or mechanical holding elements.

Preferably, the main body is formed by a support beam, wherein the arms are movably mounted on the support beam. Therefore, a plurality of arms which define the holding region of the tooling with the holding elements arranged thereon are arranged along the support beam. The mounting of the holding elements may be carried out in through-openings in the support beam but bearing bushes arranged laterally on the support beam are also possible. Such bearing bushes may extend partially into recesses in the support beam.

Advantageously, the arms are guided in plain bearings arranged on the main body. These bearings permit an accurate and stable mounting, and they are of simple and robust construction and of low maintenance.

Alternatively, rolling bearings or mixed forms of plain and rolling bearings are also possible.

Advantageously, the arms and the support beam span a common plane, wherein both a one-sided and a two-sided arrangement of the arms is possible. The two-sided arrangement in this case is preferred since it results in an improved torque compensation relative to the forces acting on the support beam. The corresponding geometry is adapted to the two-dimensional character of the workpieces to be processed and permits a flexible use of the tooling.

Advantageously, the linear movement paths of the arms are parallel to one another, i.e. the arms are arranged parallel to one another on the support beam. Due to this arrangement the reconfiguration of the tooling is simplified, since the movement of the holding elements may be carried out parallel to one another and thus, in addition, the forces required for the movement all act along parallel lines of action.

Preferably, the linear movement path of all of the arms is oriented perpendicular to a longitudinal extension of the support beam, wherein the arms intersect the support beam with their longitudinal extension. This permits a simple and compact configuration of the tooling. When the holding elements are retracted relative to the support beam, the length of the portion of the corresponding arm extending to the opposite side of the support beam increases, wherein the holding element in principle is movable as far as the support beam (or as far as the immediate vicinity thereof).

Advantageously, the fixing apparatuses are formed by clamping units. These clamping units are arranged either on the main body and exert a controllable and/or activatable and deactivatable clamping force onto the arms or they are arranged on the arms and exert a controllable and/or activatable and deactivatable clamping force onto the main body. The control of the clamping units may be carried out by local elements (for example electrically switchable valves or servo motors) in groups or centrally on the main body or outside the tooling. Since the release and the fixing only take place during the reconfiguration of the tooling, rapid switching times are not required.

Clamping units permit a fixing of the arms in any movement position.

Advantageously, the clamping force is mechanically created by a spring and may be temporarily deactivated by means of a pneumatic cylinder so that the clamping is released. Alternatively, the clamping force is pneumatically created, so that the clamping is released when the pneumatic line is switched off.

Hydraulic or electric clamping units or alternative units with adjustable elements (such as pins or cams) are also possible for the positive fixing.

Advantageously, the holding elements are movable relative to the respective arm from an active position into an inactive position. This permits the selective use of individual holding elements whilst other holding elements are inactive. This simplifies, in particular, the adaptation to workpieces of different size. The movement from the active into the inactive position may be carried out in different ways.

In the case of vacuum suction cups, the vacuum line to the suction cups has to be selectively blocked in the inactive position. This may be carried out directly on the vacuum suction cup or via valves and/or valve batteries provided in groups or centrally.

Advantageously, an adjustment unit is arranged on each of the arms in order to move the holding elements in a linear manner between the active and the inactive position. If the holding elements in the active position are arranged in one plane, for example, they may be moved selectively along a straight path perpendicular to this plane into the inactive position.

In addition to the aforementioned arms, further arms which do not have an adjusting unit may be present. For example, the tooling comprises a central group of arms which are intended to be used for picking up all of the workpieces, whilst two additional groups of arms with deactivatable holding elements are present to the side of the central group, said additional groups of arms being selectively used. Arms without holding elements may also be present, for example those with sensors, in particular for detecting whether only a single workpiece has actually been received (double sheet sensor).

Preferably, the adjusting unit comprises a single-acting pneumatic cylinder and a restoring device, in particular a spring-based restoring device. Each of the holding elements has, therefore, just two defined positions, namely the active position and the inactive position. The control may be implemented in an exceptionally simple manner and the two positions are mechanically defined in an accurate manner. If a spring-based restoring device is used, with a suitable spring characteristic this also directly results in the generally desired resilient mounting of the holding element, for example of the vacuum suction cup. This permits in a simple manner an individual adaptation of the vertical position of the holding elements when receiving the workpieces, for example in the case of stacks which are not accurately horizontally aligned or when receiving so-called "tailored blanks" which have different heights in a direction perpendicular to the two-dimensional extension and thus result in stacks in which the uppermost workpiece to be picked up does not come to rest horizontally.

Instead of linear movements, pivoting movements (or combinations of both types of movement) are also possible. If the holding elements in the active position are arranged in one plane, for example, the holding elements may be pivoted away out of this plane, for example about an axis which is oriented parallel to this plane but is arranged to the rear of this plane.

In simpler embodiments, the possibility of deactivation may be dispensed with. Holding devices which are not required are in this case moved along the movement path into a position where they are not in contact with the workpieces to be held but do not interfere with the movement. In the case of vacuum suction cups, naturally in this case an option for the selective blocking of the vacuum line is also required.

A system according to the invention for processing two-dimensional workpieces comprises a transport device, a tooling according to the invention being fastened thereto, and a setting device separate from the tooling for moving the arms relative to the main body of the tooling, wherein the setting device is arranged in a region of the system into which the tooling is movable by means of the transport device.

The processing of the workpieces may be a forming, trimming or punching, a machining, a coating or painting, a pure transporting process, a combination of such steps or any other actions for which the workpieces have to be picked up and held.

The fastening of the tooling to the transport device may be carried out in different ways. Thus a quick coupling device may be present so that the tooling may be replaced in a simple and rapid manner. Since the change should rarely be required due to the reconfigurability, the tooling may also be attached to the transport device via a conventional screw connection or a different connection. Even a fixed arrangement, for example via a welding process, or a one-piece design of the tooling (or parts thereof) with the transport device (or parts thereof) is conceivable.

The setting device is arranged separately from the tooling, i.e. during the operation of the system for processing two-dimensional workpieces the tooling is moved without the setting device. The setting device is arranged, in particular, in a stationary manner in the system.

Advantageously, the setting device comprises a plurality of linearly movable elements, wherein the tooling is positionable relative to the setting device such that the linearly movable elements may cooperate at the same time with a plurality of the arms for the movement thereof along the movement path.

Preferably, the setting device for each arm of the tooling comprises a linearly movable element, so that the reconfiguration of the tooling may be carried out in one step simultaneously for all of the arms. In this case, toolings which have fewer arms may also cooperate with this setting device—so that not all of the movable elements are required for the reconfiguration—and toolings which have more arms—in this case a plurality of setting steps are required, wherein the relative position between the tooling and setting device is altered between the steps. This alteration may be carried out by the movement of the setting device, the tooling or both elements. Preferably, the alteration is permitted by a movement of the tooling, since the transport device on which the tooling is mounted generally readily permits the required relative movement.

Particularly preferred are embodiments in which the arms extend parallel to one another in the same plane. The linearly movable elements are thus also moved along paths running parallel to one another in the same plane. Correspondingly, the setting device may be designed in a structurally simple manner.

Advantageously, the system comprises a preparation unit for the two-dimensional workpieces, wherein the setting device is integrated in the preparation unit. As is set forth below, this integration has several advantages. In any case, the tooling may be moved by means of the transport device to the preparation unit for the workpieces. The combination of the preparation unit and the setting device, therefore, results in a reduced space requirement.

The preparation unit comprises, for example, a preparation space in which the workpieces to be processed are prepared for being received by the tooling, for example as a stack. The preparation unit may additionally comprise guides or receivers for the workpieces, devices which simplify the picking up of the workpieces, detectors of the workpiece position, etc.

Preferably, the elements comprise devices for spreading apart the workpieces to be prepared. The elements, therefore, are part of a so-called "fanner". Both for the reconfiguration of the tooling and for the spreading apart, the elements have to be moved into positions adapted to the workpiece contour, so that substantially the same degrees of freedom may be used for both purposes. Due to the multiple function, the construction effort for the system according to the invention is reduced.

Particularly preferably, these devices are magnetic heads. These heads are suitable for spreading apart stacked metallic workpieces. Alternatively or additionally, the devices have outlets for compressed air. Thus it is also possible to spread apart non-metallic (and/or non-ferromagnetic) workpieces.

A corresponding method according to the invention for processing two-dimensional workpieces comprises the following steps:

a) moving a tooling into an interactive position with a setting device, wherein the tooling comprises holding elements which are passively movable along a linear movement path;

b) setting positions of the holding elements of the tooling by means of the setting device as a function of a geometry of the two-dimensional workpieces to be processed, wherein the holding elements are moved in a linear manner independently of one another by the interaction with movable elements of the setting device along the movement path and after the movement has taken place a position of the holding element along the movement path is fixed by means of a fixing apparatus arranged on the tooling;

c) picking up the two-dimensional workpieces to be processed, by means of the tooling.

Preferably, in the interactive position the tooling and the setting device are arranged relative to one another such that the movable elements of the setting device are movable parallel to one another in the same plane in which the holding elements are linearly movable parallel to one another along their movement path. Due to this arrangement the setting device may be configured in a structurally simple manner, since the movement directions of the movable elements are parallel to one another and thus the forces required for the movement of the holding elements all act in the same direction.

Advantageously, the method according to the invention comprises the further step of deactivating holding elements of the tooling which are not required for picking up the two-dimensional workpieces to be processed. This step may be dispensed with on a case-by-case basis in the practical implementation of the method if all of the holding elements are already activated and are also required for picking up the workpieces.

This permits the selective use of individual holding elements whilst other holding elements are inactive. This simplifies, in particular, the adaptation to workpieces of different size. In the case of vacuum suction cups, the vacuum line to the suction cups has to be selectively blocked in the inactive position. This may be carried out directly on the vacuum suction cup or via valves and/or valve batteries provided in groups or centrally.

Advantageously, the method according to the invention comprises the further step of spreading apart a plurality of workpieces by corresponding devices which are arranged on the movable elements of the setting device. The elements are thus part of a so-called "fanner". Both for reconfiguration of the tooling and for the spreading apart, the elements have to be moved into positions adapted to the workpiece contour so that substantially the same degrees of freedom may be used for both purposes.

Advantageously, the method according to the invention comprises the further step of receiving a contour of the two-dimensional workpiece to be processed, by means of the movable elements of the setting device. The contour of the workpiece is subsequently taken into account, in particular, when positioning the holding elements. The receiving of the contour is carried out, in particular, mechanically by the movable elements being moved toward the workpiece until they strike against the outer contour thereof. Alternatively, a contactless detection is also possible, for example by means of electromagnetic, capacitive, inductive or other suitable sensors.

By the integration of this function the number of elements required is reduced and in any case also the space requirement for the system; since the movable elements are additionally used both for receiving the contour and for positioning the holding elements, possible sources of error between the receiver and the setting are reduced.

Alternatively, the workpiece contours may also be detected independently of the system according to the invention and/or the method according to the invention, for example manually or by means of a stationary camera.

Further advantageous embodiments and combinations of features of the invention result from the following detailed description and the entirety of the claims.

BRIEF DESCRIPTION OF THE DRAWINGS

In the drawings used for describing the exemplary embodiment.

In principle, the same parts are provided with the same reference numerals in the figures.

WAYS OF IMPLEMENTING THE INVENTION

Figure 1:
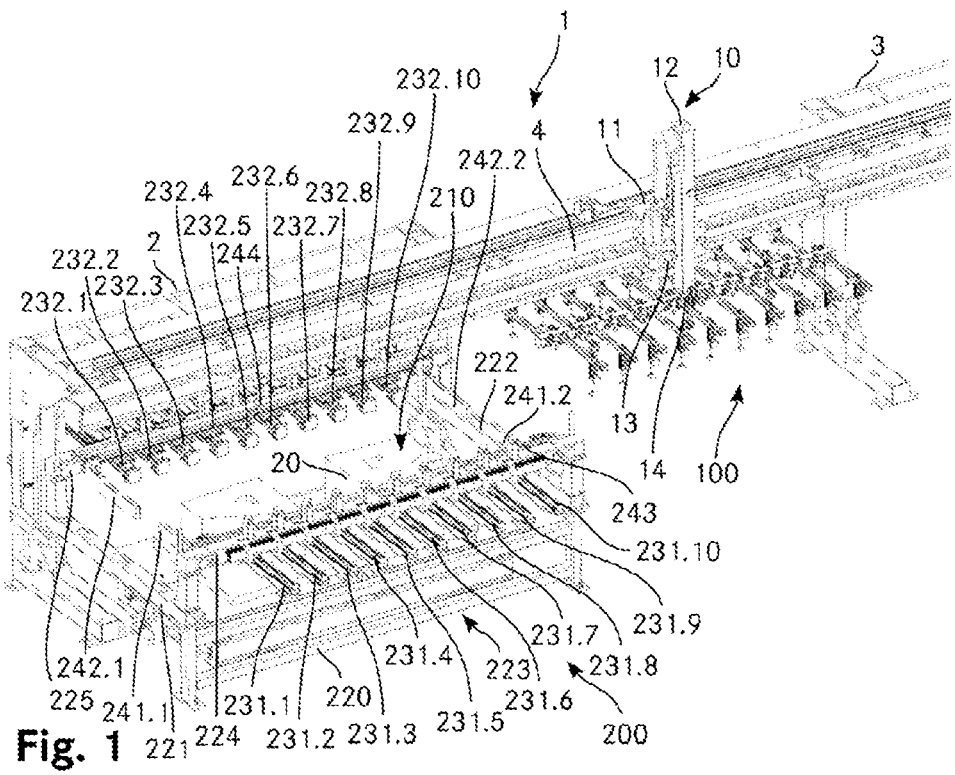
FIG. 1 shows an oblique view of a system according to the invention for processing two-dimensional workpieces.

FIG. 1 is an oblique view of a system according to the invention for processing two-dimensional workpieces. The system 1 comprises a machine frame with individual frame units 2, 3. A longitudinal rail 4 is arranged between the frame units 2, 3, in a manner known per se. Since it is a case of conventional components, these components are not described in more detail herein.

A handling device 10 is movably mounted on the longitudinal rail 4. The handling device 10 comprises a carriage 11 which is linearly movably mounted on the longitudinal rail. A support element 12 is mounted on the carriage 11 so as to be movable in the vertical direction. The vertical position is set by means of a drive 13 arranged on the carriage 11. At the lower end, the support element 12 has a connecting plate 14. These elements are also known per se and do not have to be described in more detail.

A tooling 100 according to the invention is fastened to the connecting plate 14. This tooling is described in more detail below in connection with FIGS. 2-10.

A preparation unit 200 is arranged on one of the frame units 2. This preparation unit comprises a preparation space 210 for workpieces 20, not shown in more detail. In the example shown, the workpieces 20 are vehicle body panels (for example for side doors of automobiles) which are provided in two stacks. The two stacks are deposited on a height-adjustable support (not shown). In FIG. 1 the support is located in its lowest position.

The preparation unit 200 further comprises a base frame 220 which is fastened to the frame unit 2 and which extends from the frame unit 2 on the longitudinal rail side to the side opposing the workpieces 20. To this end, said base frame comprises two transverse beams 221, 222 which extend perpendicular to the longitudinal rail 4 from the frame unit 2 to the opposing side. Here an auxiliary frame 223, with two feet, two vertical supports, two longitudinal struts and a support strut 224 arranged on the upper end of the supports, is connected to the transverse beam 221, 222. The base frame 220 has a second support strut 225 on the longitudinal rail side. The two support struts 224, 225 run parallel to the longitudinal rail 4 and are arranged directly opposing one another. Ten setting units 231.1 . . . 10, 232.1 . . . 10 are arranged on each of the support struts 224, 225. The setting units 231, 232 are movable independently of one another in the transverse direction, i.e. in a horizontal plane perpendicular to the longitudinal rail. To this end, each of the setting units 231, 232 has a servo drive, an elongated setting element being able to be moved thereby in the transverse direction relative to the respective support strut 224, 225. The drives are arranged in a stationary manner on the respective support strut 224, 225. In FIG. 1 all of the setting units 231, 232 are located in their outermost position, and by means of the drives they may be moved toward one another and thus into the preparation space 210 of the workpieces.

On their inner ends the setting units 231, 232 have contact pieces. These contact pieces have a planar front surface and in each case are pivotable about a vertical axis. The resting position of the front surfaces is located parallel to the longitudinal rail 4 and is adopted due to corresponding spring means when the action of force on the respective front surface is absent. A permanent magnet is arranged behind each front surface.

The preparation unit 200 further comprises four side guide elements 241.1, 241.2, 242.1, 242.2, wherein two respective elements are movable along a longitudinal rail 243, 244 independently of one another. The longitudinal rails 243, 244 extend parallel to the longitudinal rail 4 of the machine frame over the entire region which is adopted by the setting units 231, 232. The side guide elements extend transversely to the extent of the longitudinal rails 243, 244 into the preparation space 210 for the workpieces 20 and have planar vertical side surfaces.

Figure 2:
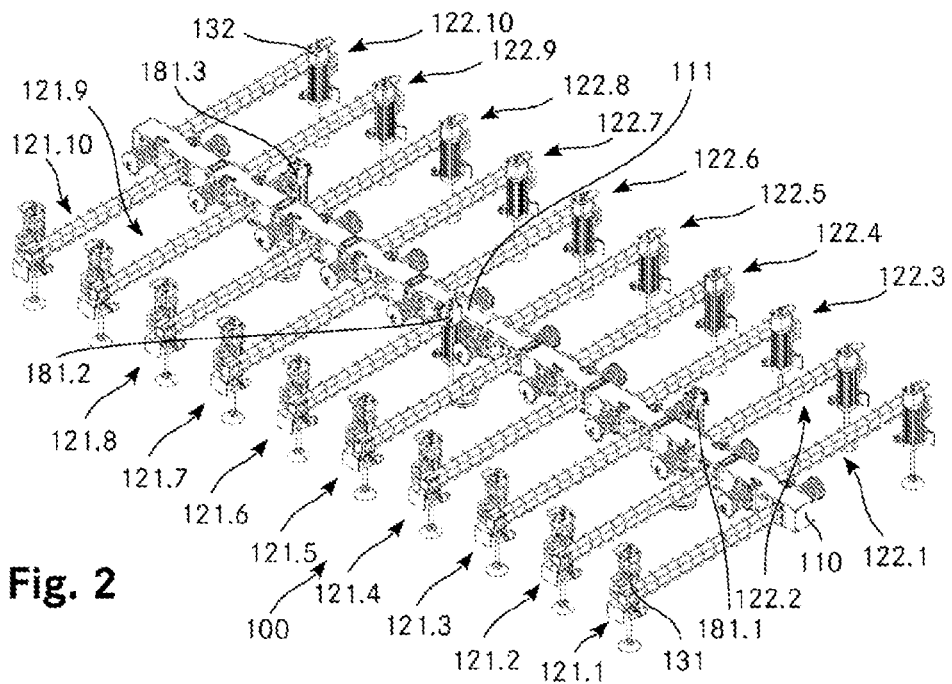
FIG. 2 shows an oblique view of the tooling of the system with holding arms extended to a maximum.

FIG. 2 is an oblique view of the tooling of the system with the holding arms extended to a maximum. The tooling 100 comprises a support beam 110 with a substantially square cross section, with a connecting plate 111 arranged centrally on the upper face thereof for attaching to the corresponding connecting plate of the handling device. Ten holding arms 121.1 . . . 10, 122.1 . . . 10 are respectively mounted on the support beam 110 on both sides at a regular spacing. The holding arms 121, 122 are straight and the longitudinal direction of all of the arms is parallel, perpendicular to the longitudinal direction of the support beam 110. All of the holding arms 121, 122 and the support beam 110, therefore, define just one plane.

For mounting the holding arms 121, 122 the support beam 110 comprises twenty through-openings having a substantially square cross section, the holding arms 121, 122 passing through said through-openings with a corresponding, also substantially square, cross section. The holding arms 121, 122 in each case bear a suction cup unit 131, 132 on their outer ends. The holding arms 121, 122 and the suction cup units 131, 132 are described in more detail below in connection with FIGS. 3, 7 and 8.

The tooling 100 also has three suction cup units 181.1, 181.2, 181.3 arranged fixedly on the support beam 110. Each of these suction cup units 181.1 . . . 3 comprises an electromagnetically acting double sheet sensor known per se. The contact of the respective workpiece with the suction cup unit 181.1 . . . 3. ensures that the double sheet sensor adopts a defined position relative to the workpiece and by means of the sensor it is possible to establish whether just one metal plate is held by the tooling 100 or whether a plurality of plates adhere to one another. If the latter is the case, it is possible to prevent that a plurality of plates are conveyed at the same time into a subsequent station, for example a forming press, which would lead to damage to the workpieces and/or the subsequent station. The arrangement of the three suction cup units 181.1 . . . 3 with the double sheet sensors ensures that a double sheet detection is possible, both when only an individual (large-surfaced) plate is transported and also when two smaller plates are detected adjacent to one another by the tooling 100. The number of double sheet sensors may be adapted to the designated applications. If only large-surfaced workpieces are individually received, a single double sheet sensor may be sufficient. When receiving a plurality of workpieces adjacent to one another, depending on the anticipated geometry, two or more than three double sheet sensors (with corresponding suction cup units) may also be expedient.

Figure 3:
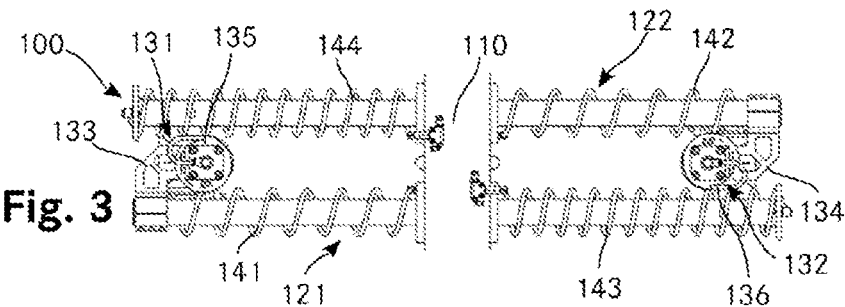
FIG. 3 shows a plan view of two adjacent partially extended holding arms.

FIG. 3 is a plan view of two adjacent, partially extended holding arms 121, 122 of the tooling 100. The holding arms 121, 122 extend through the corresponding openings of the support beam 110 and protrude on both sides of the support beam 110 vertically beyond said support beam. The suction cup units 131, 132 arranged at the free ends of the holding arms 121, 122 are arranged in the case of adjacent holding arms 121, 122 on opposing sides relative to the support beam 110. To this end, an L-shaped fastening profile 133, 134 is fastened to the corresponding front face end of the holding arm 121, 122, the first limb of said fastening profile extending in the plane defined by the holding arms 121, 122 to the side, perpendicular to the holding arm 121, 122. The second limb extends in turn in the same plane, perpendicular to the first limb and inwardly toward the support beam 110. The respective suction cup unit 131, 132 is arranged at the end of the second limb of the fastening profile 133, 134.

A vacuum line 141, 142 for each holding arm 121, 122 extends from the support beam 110 to a suction head 135, 136 of the suction cup unit 131, 132. To this end, the vacuum line 141, 142 is wound in a helical manner on the portion of the holding arm 121, 122 on the suction cup side. During retraction and extension, the winding spacing alters so that the vacuum line 141, 142 is able to participate readily in the alteration to the length of the corresponding portion of the holding arm 121, 122 on the suction cup side. A pneumatic supply line 143, 144 extends from the support beam 110 to the end of the holding arm 121, 122 remote from the suction cup unit and continues therefrom in the interior of the holding arm 121, 122 to the suction cup unit 131, 132. An adaptation to the alterable length of the portion of the holding arm 121, 122 remote from the suction cup unit also takes place here by an alteration to the winding spacing. The pneumatic supply line 143, 144 serves for supplying a pneumatic cylinder for deactivating the suction cup unit 131, 132. This is described in more detail below in connection with FIG. 8.

Figure 4:
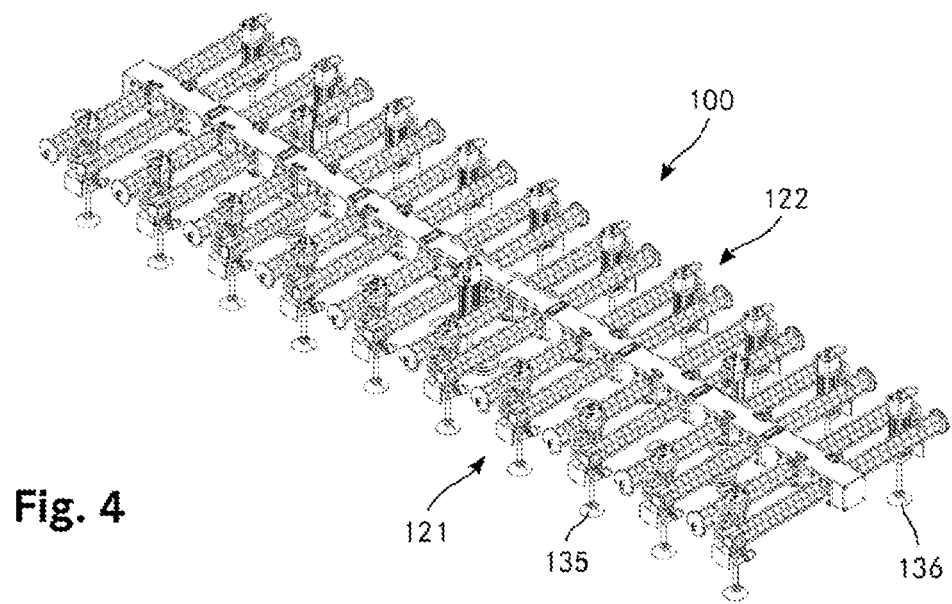
FIG. 4 shows an oblique view of the tooling with partially extended holding arms.
Figure 5:
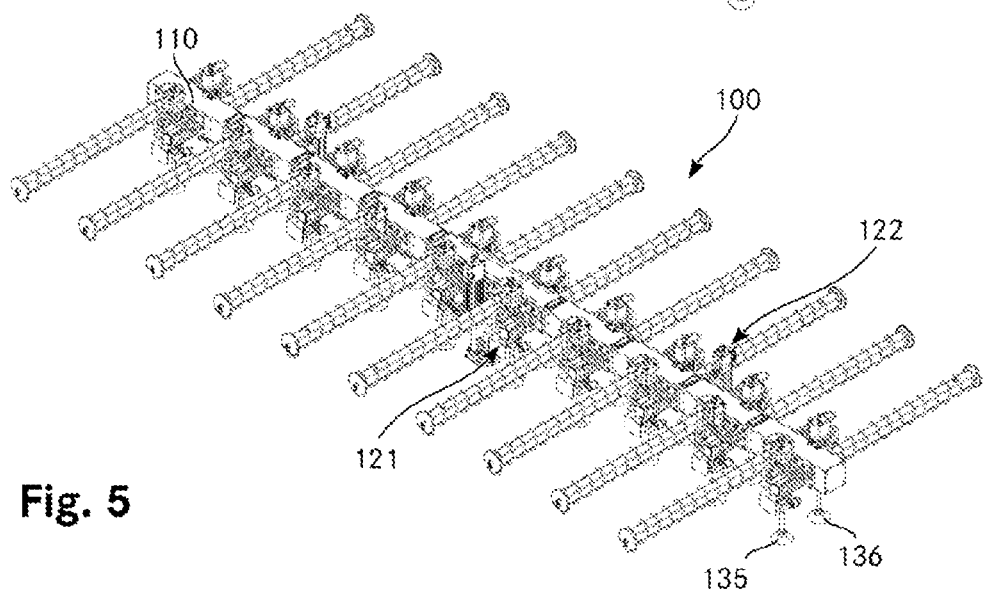
FIG. 5 shows an oblique view of the tooling with fully retracted holding arms.

FIG. 4 is an oblique view of the tooling 100 with partially extended holding arms 121, 122, and FIG. 5 is an oblique view of the tooling 100 with fully retracted holding arms 121, 122. As is visible from these figures and from a comparison with FIG. 2, a significant adjusting range in the transverse direction is achieved. In the exemplary embodiment shown, the spacing between the opposing positions of the suction heads 135, 136 in the completely extended state is 1800 mm, in the state according to FIG. 4 it is 1000 mm and in the state according to FIG. 5 it is 230 mm. The configurations shown in FIGS. 2, 4 and 5 are to be understood by way of example. In practice, the holding arms which are settable independently of one another generally have different transverse positions.

Figure 6:
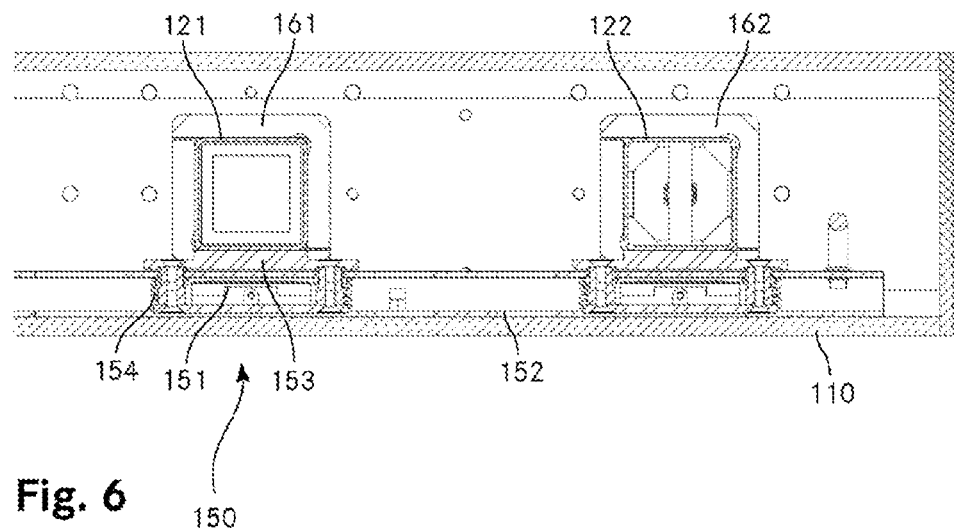
FIG. 6 shows a cross section through the support beam of the tooling with bearing bushes and clamping units for the holding arms.
Figure 7:
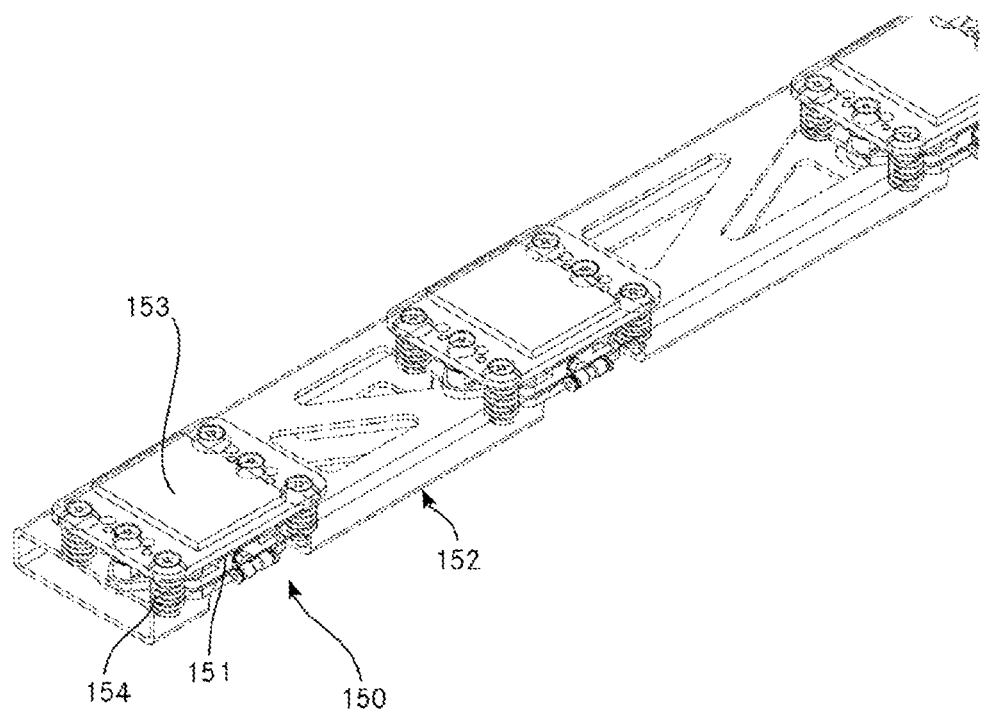
FIG. 7 shows an oblique view of the clamping units.

FIG. 6 shows a cross section through the support beam of the tooling with bearing bushes and clamping units for the holding arms, and in FIG. 7 a plurality of clamping units are shown in an oblique view. Each holding arm 121, 122 is assigned a clamping unit 150. Also shown in FIGS. 6 and 7 are the bearing bushes 161, 162 which are screwed opposite one another on both sides to the side wall of the support beam 110 and respectively have a bearing opening which surrounds the through-opening in the support beam. The through-opening has a slightly larger cross section than the bearing openings so that the bearing bushes 161, 162 form a plain bearing for the respective holding arm 121, 122. The holding arms 121, 122 do not come into direct contact with the support beam 110.

All of the clamping units 150 are mounted on a rail 152 running longitudinally in the support beam 110. Each of the clamping units 150 comprises a contact plate 153 which is vertically movably mounted on the rail 152 and via a plurality of compression springs 154 is moved into a contact position relative to the corresponding holding arm 121, 122. The clamping units 150 further comprise a single-acting pneumatic cylinder 151 which, when pressurized, moves the contact plate 153 against the force of the compression springs 154 away from the holding arm 121, 122. To this end, the pneumatic cylinder 151 acts on an actuating plate fastened to the contact plate 153 at the rear and pushes this actuating plate—together with the contact plate 153, away from the holding arm 121, 122 to the rear.

The contact plate 153 has an anti-slip coating, for example made of a rubber material, so that when a corresponding contact pressure is applied the holding arm 121, 122 is held non-positively in its movement position. The holding arms 121, 122 in the deactivated state of the pneumatic cylinder 151 are, therefore, fixedly clamped to the support beam 110 due to the spring force of the compression springs 154 of the clamping units 150. The clamping is released as soon as the pneumatic cylinder 151 is pressurized. Thus the position of the holding arms 121, 122 relative to the support beam 110 may be altered with low effort, by the action of external forces.

In the exemplary embodiment shown, the pneumatic cylinders 151 of all of the clamping units 150 are connected to the same pressure line so that the clamping units 150 are all releasable at the same time.

Figure 8:
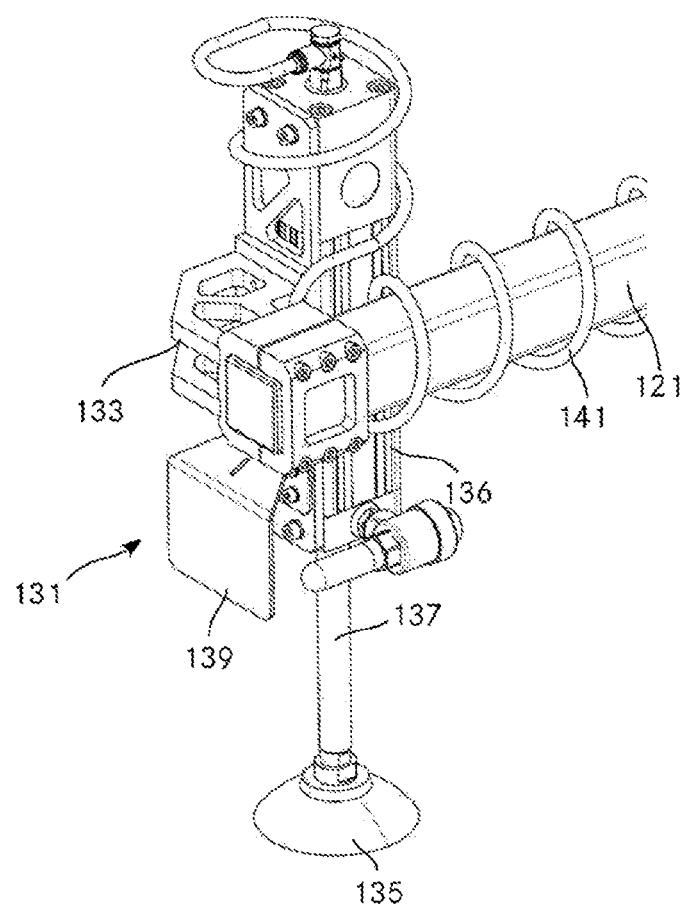
FIG. 8 shows a detailed view of a holding element of the tooling.

FIG. 8 is a detailed view of a holding element of the tooling. This holding element is formed by a suction cup unit 131 which is attached to the free end of the holding arm 121, as described above, by means of an L-shaped fastening profile 133. The suction cup unit 131 comprises a pneumatic cylinder 136 in which a pneumatic piston is vertically movably mounted. The pneumatic supply line for the control thereof opens below the pneumatic piston, said pneumatic supply line as mentioned above being guided inside the hollow profile of the holding arm 121 into the region of the suction cup unit 131 and being connected via a connector to the lower piston chamber of the pneumatic cylinder 136.

A piston rod 137 which emerges from the housing at the bottom through an opening is arranged on the pneumatic piston. A suction head 135 is arranged at the free end of the piston rod 137. This suction head is connected to the vacuum line 141 by a line running inside the piston rod 137 and a connection arranged on the upper face of the pneumatic cylinder 136. A metallic contact plate 139 is arranged on the front face on the pneumatic cylinder 136. Said metallic contact plate comprises a fastening portion which is screwed to the vertical wall of the pneumatic cylinder 136 on the front side, a transition portion which adjoins the fastening portion at the top and which extends obliquely downwardly away from the pneumatic cylinder 136, and a contact portion which adjoins the transition portion and extends downwardly parallel to the pneumatic cylinder 136.

A helical spring is arranged in the pneumatic cylinder 136. Said helical spring pushes the pneumatic piston and thus the suction head 135, when input pressure is absent, into its lower position and ensures a resilient arrangement for the contact and holding of workpieces by means of the suction head 135. If the pneumatic unit is activated, the pneumatic piston is pushed upwardly against the force of the helical spring until it reaches a corresponding stop. The piston rod 137 and the suction head 135 are correspondingly pulled back upwardly toward the pneumatic cylinder 136.

Figure 9:
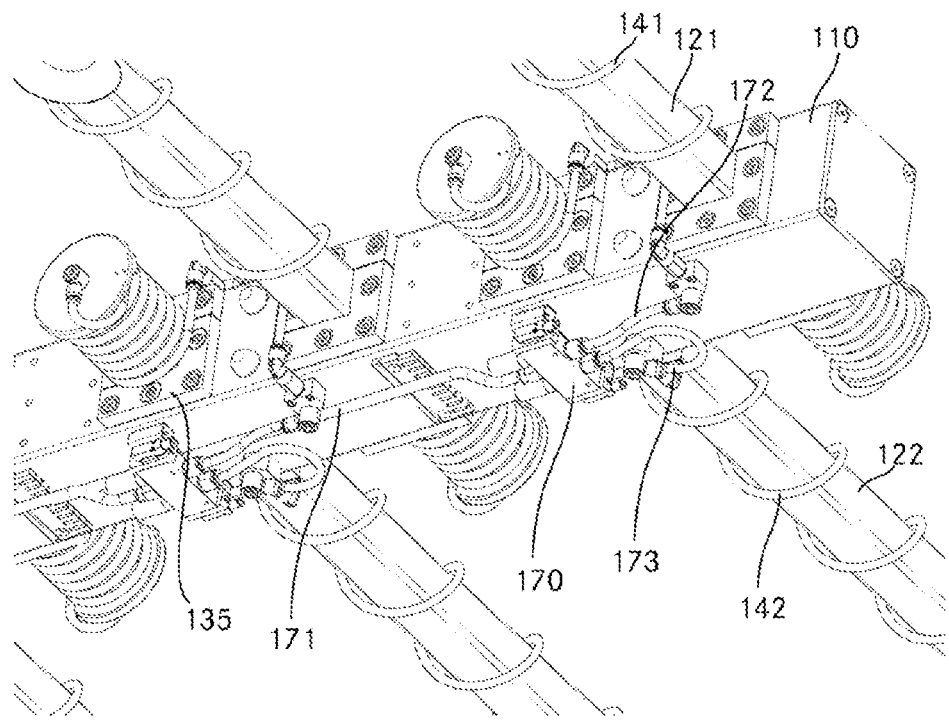
FIG. 9 shows a view of the lower face of the support beam of the tooling with vacuum lines and pneumatic supply lines.
Figure 10:
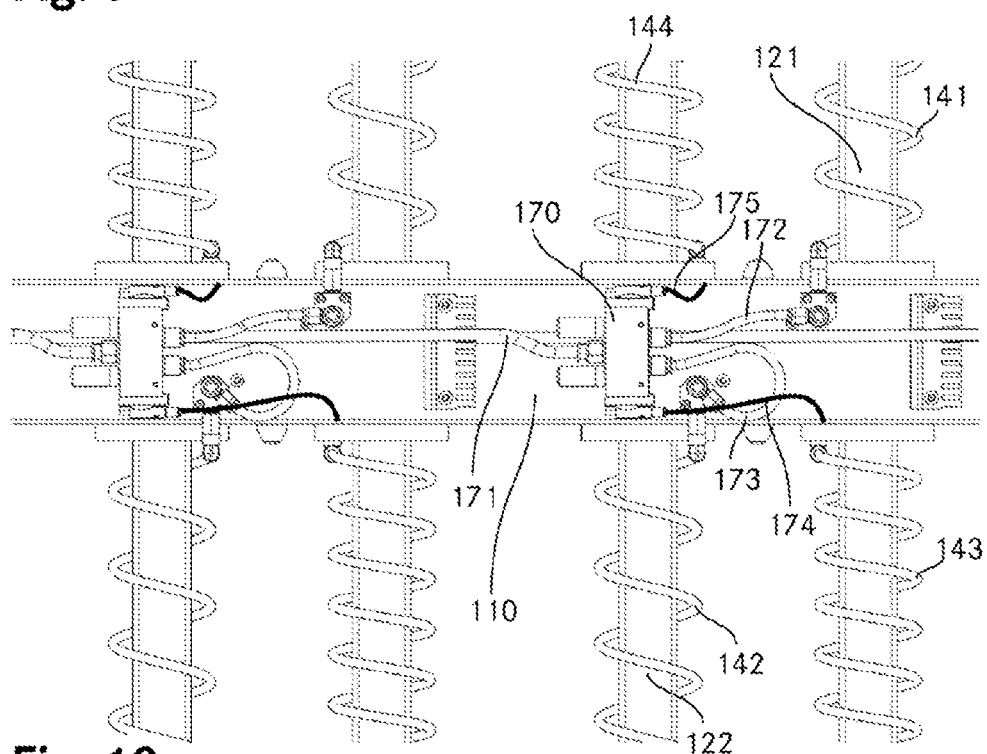
FIG. 10 shows a plan view of the lower face of the support beam with the vacuum lines and pneumatic supply lines.

FIG. 9 shows a view of the lower face of the support beam 110 of the tooling with vacuum lines and pneumatic supply lines, and in FIG. 10 a plan view is shown of the lower face of the support beam 110 with the vacuum lines and pneumatic supply lines.

A vacuum line 171 connected to a vacuum pump feeds into a valve device 170. Said valve device comprises two 3/2-way valves. The outlets of said valves are connected via connecting lines 172, 173 to the vacuum lines 141, 142 of two holding arms 121, 122 opposing one another. The 3/2-way valves of the valve device 170 are pneumatically precontrolled and to this end are connected via control lines 174, 175 to the pneumatic supply lines 143, 144. The corresponding valve device 170 and the aforementioned lines are repeated for each pair of holding arms on the support beam 110.

If one of the pneumatic supply lines 143, 144 is pressurized, this leads—as described above—to the piston rod 137 being moved with the suction head 135 upwardly into an inactive position. The pressure in the supply line 143, 144, due to the pneumatic precontrol, also leads to the corresponding 3/2-way valve of the valve device 170, which is open in the resting state, being blocked relative to the vacuum line to the corresponding suction head 135. The suction head 135 is thus deactivated.

FIGS. 11-22 serve for describing a method according to the invention for processing two-dimensional workpieces. Thus FIGS. 11, 12, 14, 16, 19 and 22 show plan views of the system according to the invention, whilst in FIGS. 13, 15, 17, 18, 20 and 21 oblique views are shown.

Figure 11:
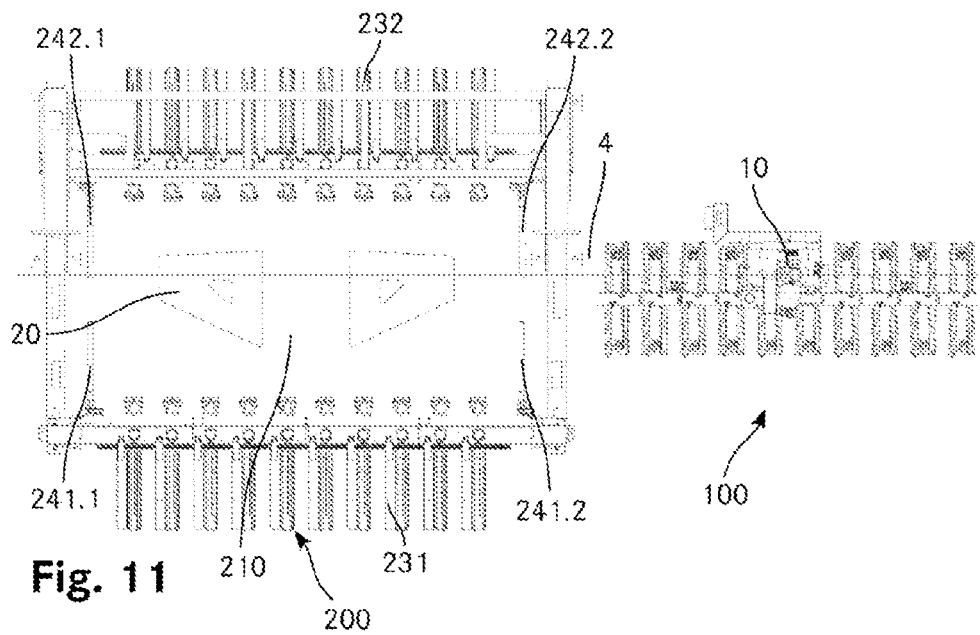
FIGS. 11-22 show oblique views and plan views of the system according to the invention for describing a method according to the invention for processing two-dimensional workpieces.
Figure 12:
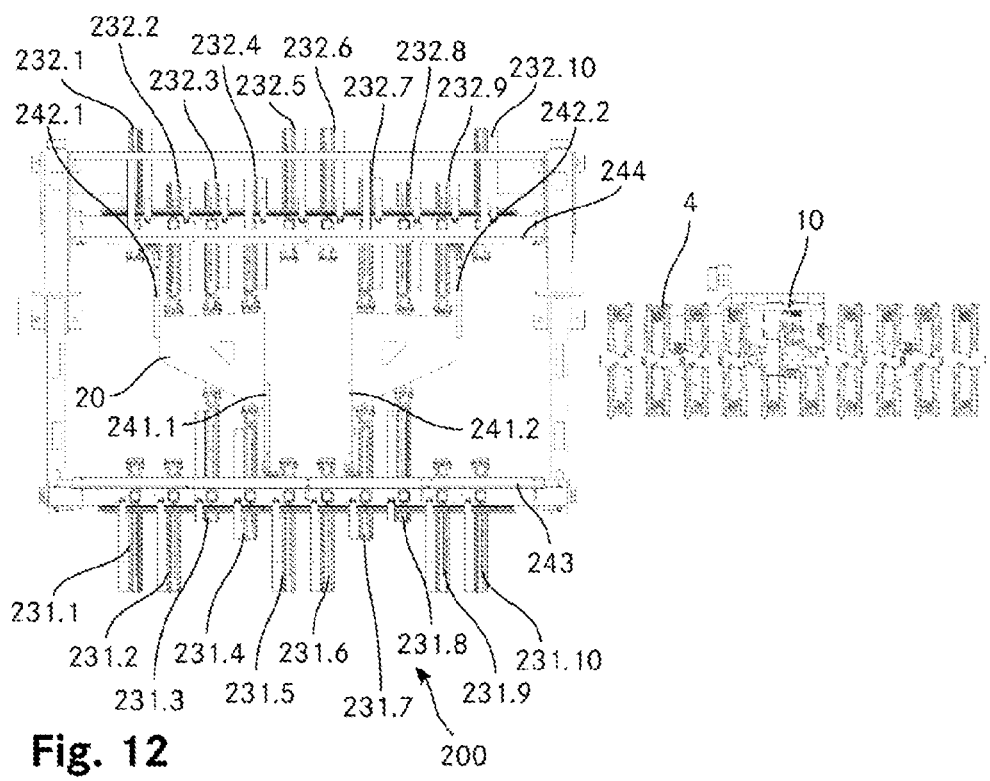
Figure 13:
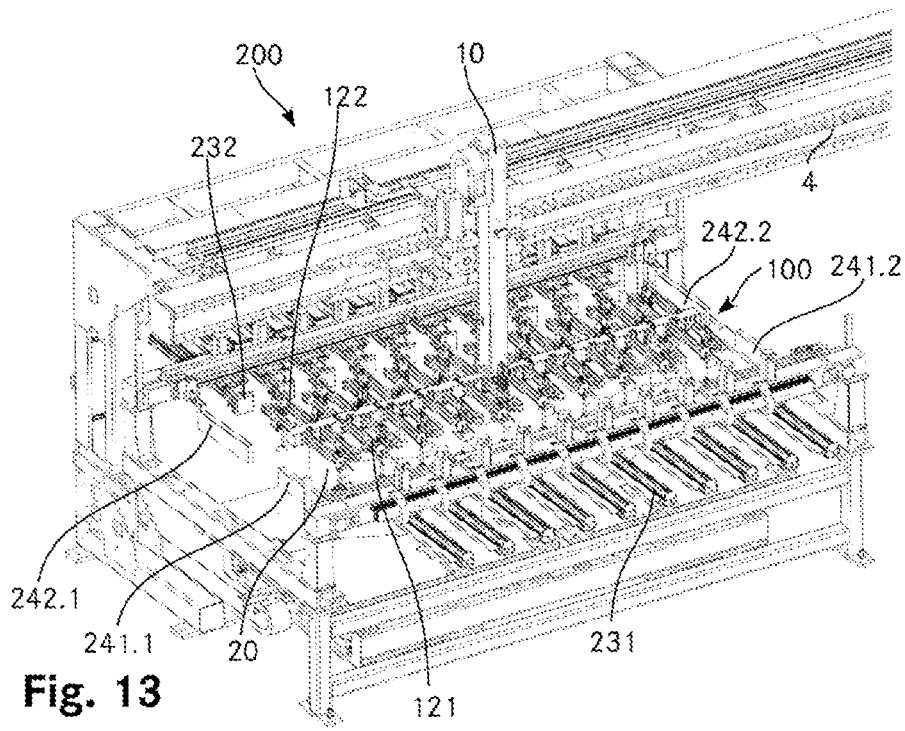
Figure 14:
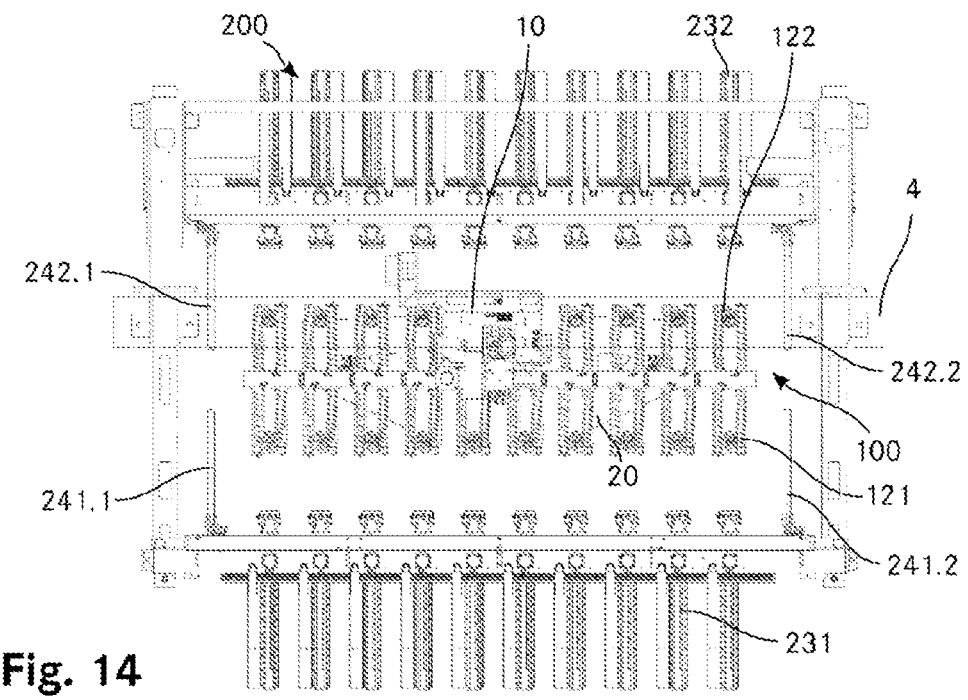
Figure 15:
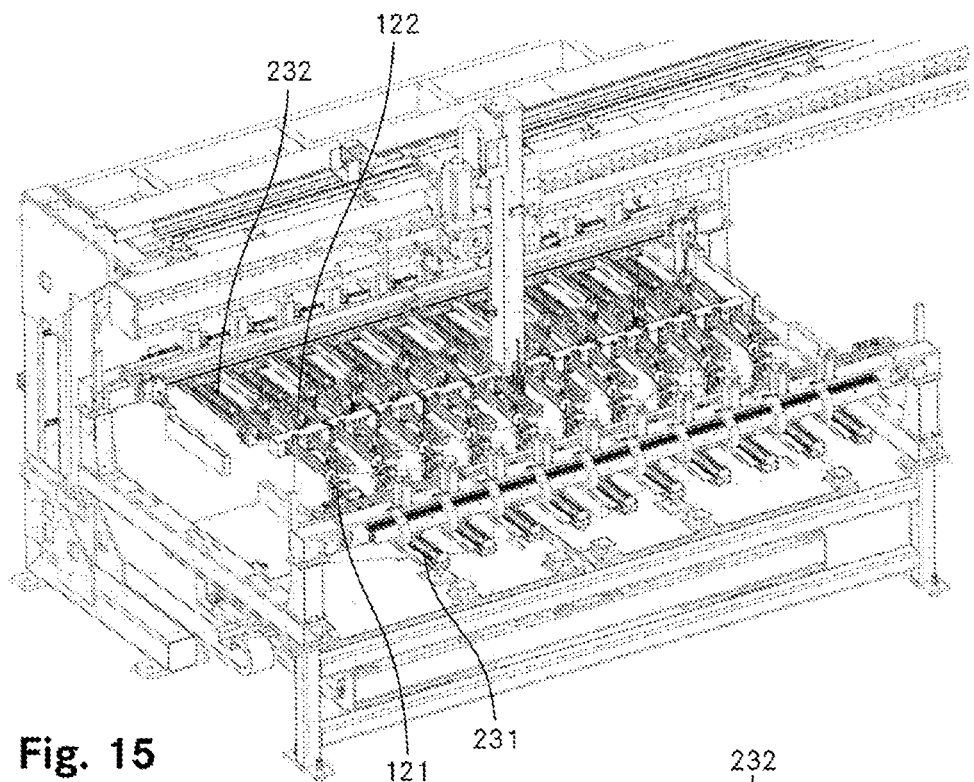
Figure 16:
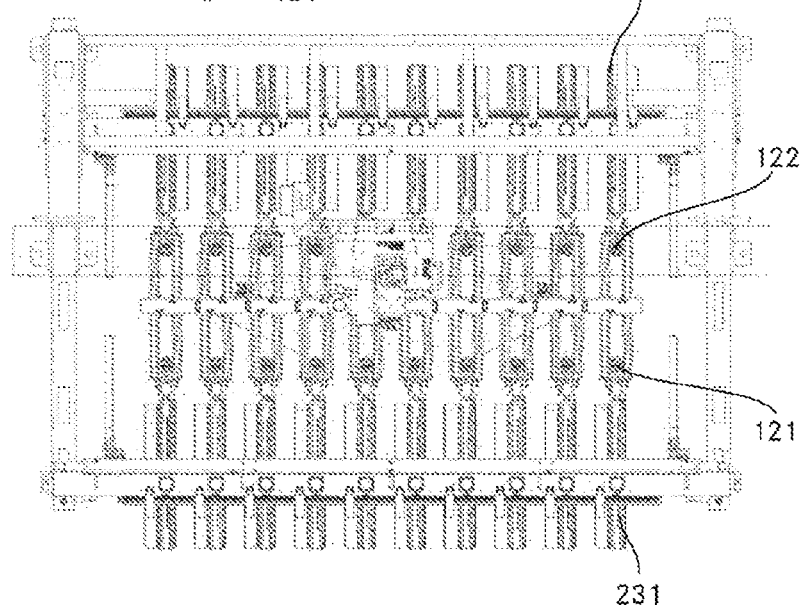

FIG. 11 shows a plan view of the system in an initial position. The tooling 100 has been positioned by means of a handling device 10 along the longitudinal rail 4 in an initial position outside the preparation unit 200. The total of twenty holding arms 121, 122 are located in a central position similar to the situation according to FIG. 4. The workpieces 20 are located in two aligned stacks in the preparation space 210 of the preparation unit 200. The total of twenty setting units 231, 232 are all located in their outermost, pulled-back position. The side guide elements 241.1, 241.2, 242.1, 242.2 are located in their outermost longitudinal positions, outside the region of the setting units 231, 232.

Starting from this initial position, in a first step the teaching of the contours of the workpieces 20 takes place. This is shown in the plan view of FIG. 12. In the configuration shown, initially the side guide elements 241.1, 241.2 of one side are moved into a central position between the two workpieces 20. The workpieces 20 are then moved by means of the height-adjustable support into a raised position so that they pass through the horizontal plane defined by the setting units 231, 232 of the preparation unit 200. The side guide elements 241.1, 241.2 located in the central position are then moved outwardly along their longitudinal rail 243 and the side guide elements 242.1, 242.2 of the other side, which are located in their outer position, are moved along their longitudinal rail 244 inwardly until all of the side guide elements 241.1, 241.2, 242.1, 242.2 are brought with their side surfaces into contact with one of the workpiece stacks. As a result, the setting units 231, 232 are moved inwardly until their contact pieces come into contact with the contour of the stacks of the workpieces 20. In this case, the orientation of the front surface of the contact pieces is adapted to the contour of the workpiece 20 at the contact point. Setting units 231.1, 231.2, 231.5, 231.6, 231.9, 231.10, 232.1, 232.5, 232.6, 232.10, which also have no contact with the workpieces 20 in the fully retracted position, are moved back again fully. The position of the remaining setting units 231.3, 231.4, 231.7, 231.8, 232.2, 232.3, 232.4, 232.7, 232.8, 232.9 is stored in the system controller. This completes the teaching of the workpiece contours.

The setting units 231, 232 of the preparation unit 200 are then moved fully outwardly into their pulled-back position and the workpieces 20 are lowered. The side guide elements 241.1.241.2, 242.1, 242.2 are also moved into their outer resting position. Now the tooling 100 may be moved by means of the handling device 10 along the longitudinal rail 4 into the preparation unit 200. The tooling 100 is aligned in its longitudinal position along the longitudinal rail 4 and in terms of its height such that each of the longitudinal axes of the holding arms 121, 122 is aligned with one respective longitudinal axis of one of the setting units 231, 232. The corresponding situation is shown in the oblique view of FIG. 13 and the plan view of FIG. 14.

Next the setting units 231, 232 with their contact pieces are moved inwardly as far as the ends of the holding arms 121, 122. The permanent magnets are moved directly behind the front surface of the contact pieces so that they become active and cooperate with the metallic contact plates 139 of the holding arms 121, 122 (see FIG. 8). Subsequently, the clamping units 150 (see FIGS. 6, 7) are released. Thus the holding arms 121, 122 may be freely moved and positioned in both directions by means of the setting units 231, 232 in their longitudinal direction. This resulting situation is shown in the oblique view according to FIG. 15 and the plan view according to FIG. 16.

The positioning of the holding arms 121, 122 is carried out according to the detected positions of the setting units 231, 232 in the earlier teaching step. The position of the suction head of a suction cup unit of a holding arm 121, 122 results from the detected position, as follows, wherein the central line of the support beam coincides with the central line of the preparation unit 200.

| Position | Setting unit (detected) | Holding arm/suction cup unit (set) |
|---|---|---|
| Reference point | Contact point with workpiece contour | Center of suction head |
| Case 1 | none (no contact of setting unit with workpiece contour) | fully inside |
| Case 2 | spacing x from center line | spacing y from center line of support beam y = x − Δa |

Figure 17:
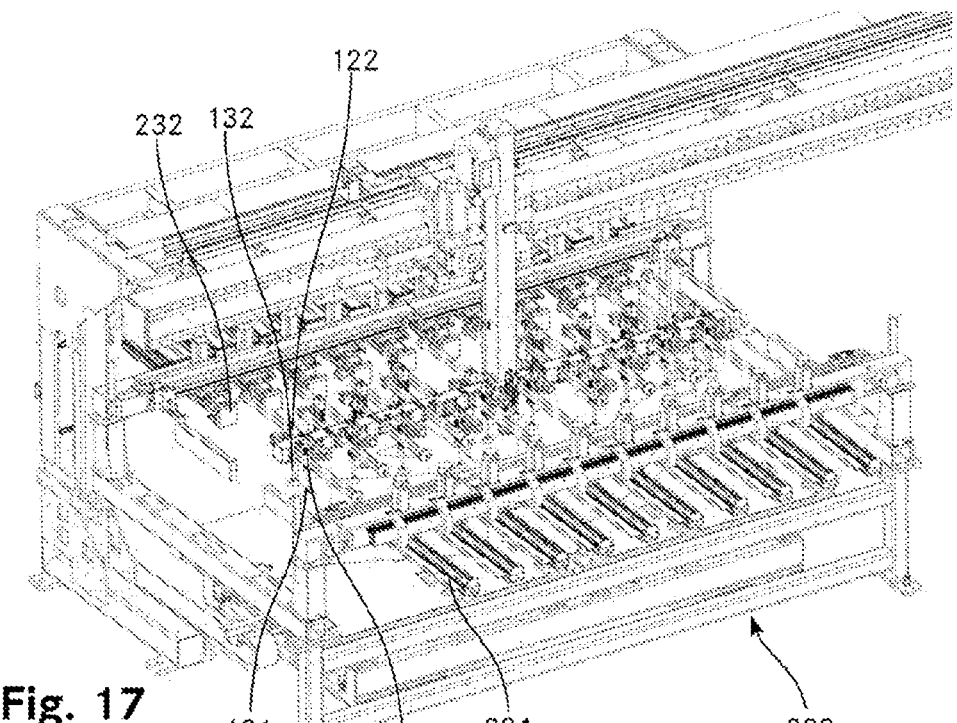

The value of the offset Δa is selected such that the suction head comes to rest fully inside the workpiece contour even in the case of a contour which runs obliquely relative to the center line. After setting the corresponding position, the clamping units 150 are activated so that the position of the holding arms 121, 122 is fixed. The permanent magnets are again moved to the rear from the front surface of the contact pieces so that relevant pulling forces no longer act on the contact plates of the holding arms 121, 122. The result of the positioning after moving away the setting units 231, 232 is shown in FIG. 17.

Figure 18:
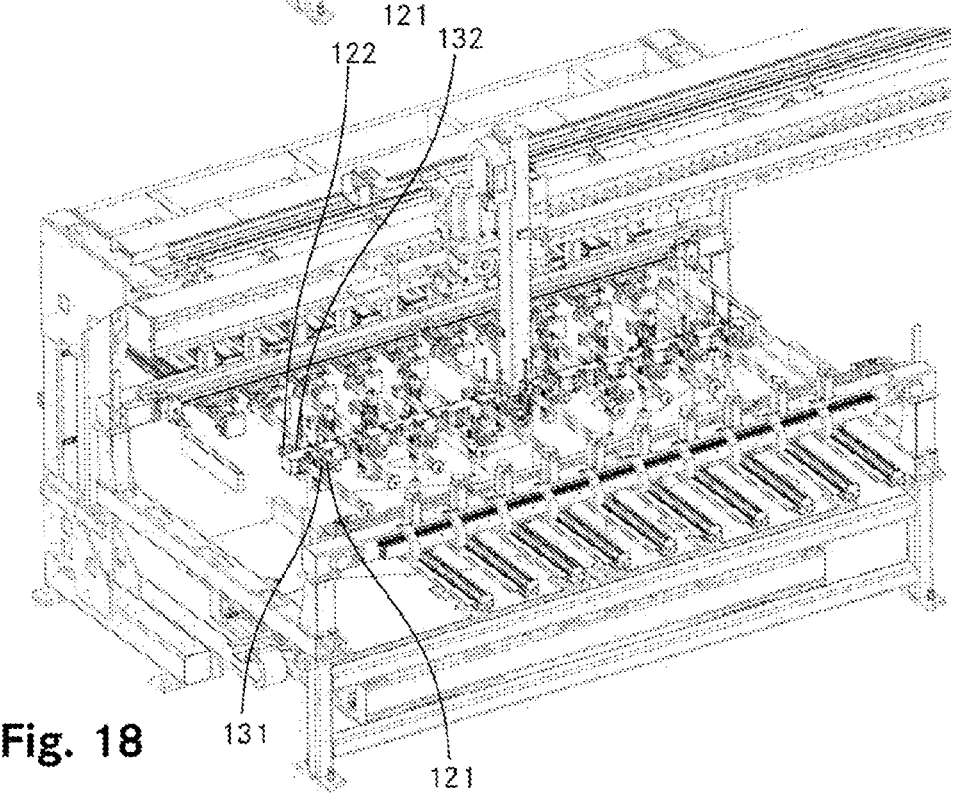

The suction cup units 131, 132 of the holding arms 121, 122, which have been positioned fully inside according to Case 1, are now lifted by actuating the pneumatic piston. This also deactivates, as described above, the vacuum line to the corresponding suction head. The result is shown in FIG. 18.

Figure 19:
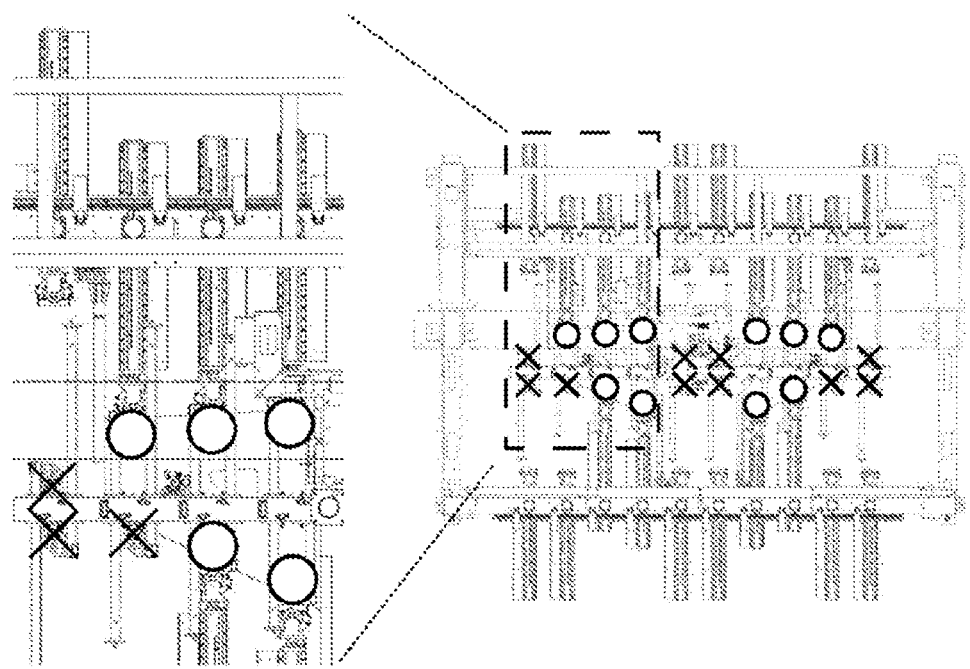

In the plan view according to FIG. 19 it is shown which of the suction cup units are activated (circle) and which are deactivated (X). From the detailed view of FIG. 19 the positions y of the suction heads and the detected spacings x of the setting units are highlighted.

Figure 20:
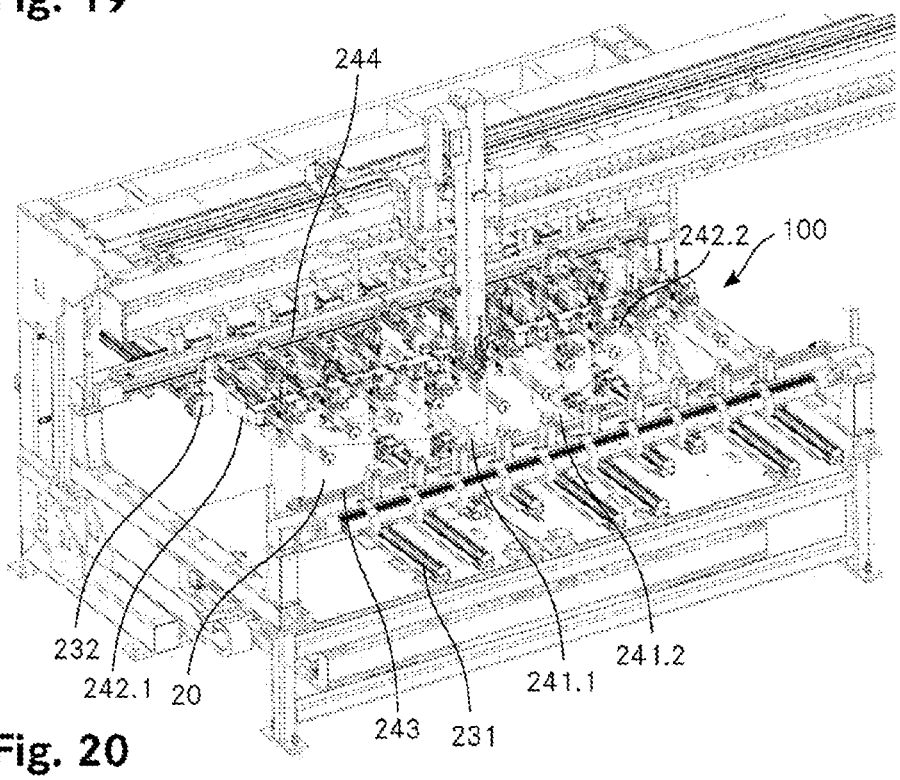

The side guide elements 241.1, 241.2 of one side are now moved back into a center position. The workpieces 20 may now be lifted again. Then all of the side guide elements 241.1, 241.2, 242.1, 242.2 are moved along the respective longitudinal rail 243, 244 toward the workpieces until they are in contact at the side. Then the setting units 231, 232 which are used are moved inwardly until they come into contact with the contour of the workpieces 20 and the front surfaces of the contact pieces are aligned with the contour. The magnets are then reactivated. The setting units then act as a fanner and lead to the two uppermost workpieces 20 of each stack being spread apart. This prevents the second workpiece from the top adhering to the uppermost workpiece and thus simplifies the receiving of the uppermost workpiece 20 in each case. The resulting situation is shown in FIG. 20.

Figure 21:
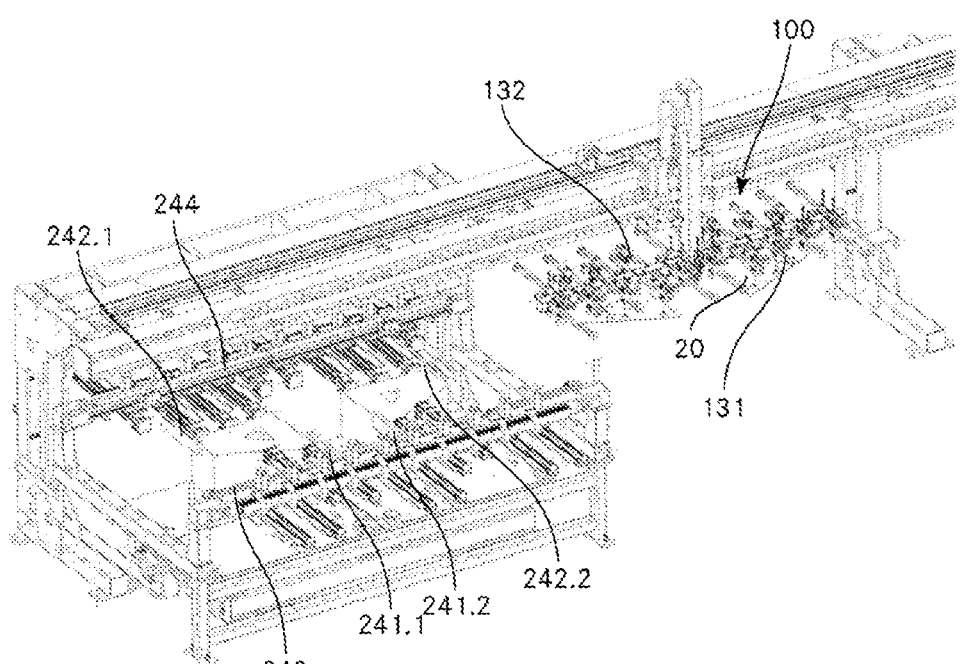
Figure 22:
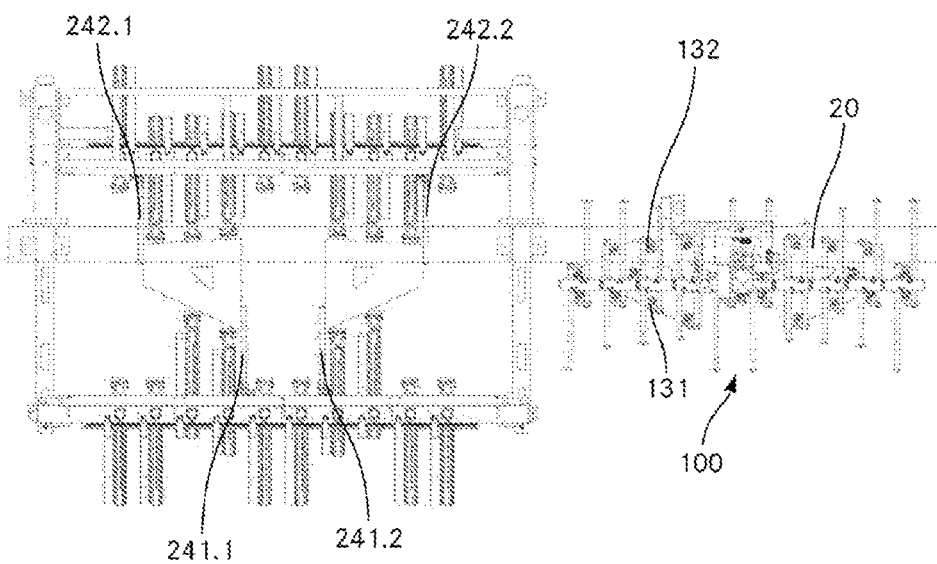

The two uppermost workpieces 20 may now be detected by the activated suction cup units 131, 132 of the tooling 100 and transported away, see FIG. 21. In each case, after lifting off a workpiece 20 or a predetermined number of workpieces, the stacks are moved upwardly until they have reached the receiving height in which the fanners may reliably spread apart the uppermost workpieces.

Based on FIGS. 11-22 the configuration of the tooling and the transport of individual workpieces from the workpiece stacks have been described. Generally further steps follow these steps, during which the workpiece is held by the tooling. For example, the workpiece held by the tooling is deposited on a transport belt which leads to a further processing station.

The invention is not limited to the exemplary embodiment shown. Thus, for example, the tooling may have a different geometry or a different number and/or arrangement of holding arms. In addition to the adjustable and deactivatable suction heads, further suction heads which are not adjustable and/or not deactivatable may be arranged on the tooling, for example in a central region, if it is assumed that in this region a contact is always made with a workpiece to be processed.

Instead of setting units with pivotable contact pieces with a planar front surface, setting units with a convex front surface may be used.

Instead of permanent magnets, additionally electromagnets may also be used. These electromagnets may be activated and/or deactivated by switching on and switching off the power supply.

Instead of the cooperation of the setting units with the holding arms by means of magnets, a purely mechanical interaction may also be provided. The holding arms are moved, for example, in the released state by means of a spring element into their maximum extended position, pushed by the setting units by the action of a mechanical force acting against the spring force into their desired position and fixed there by means of the corresponding clamping unit.

The combination of the setting units with spreading magnets is thus not mandatory. In a simplified embodiment of the invention, the device for setting the holding arm positions comprises just two movable elements which in each case may cooperate with a holding arm on one side of the support beam. For configuring the tooling, said tooling is brought successively into the interactive positions of the holding arms with the movable elements. With a one-sided arrangement of the holding arms, in principle a single movable element is sufficient. Additionally, intermediate solutions are also possible, in which a plurality of movable elements are present for each side but a plurality of steps are carried out for configuring the entire tooling (for example in each case 5 elements per side, configuration in two steps with in each case 10 holding arms).

In summary, it may be observed that the invention provides a tooling for picking up two-dimensional workpieces which is automatically configurable in a simple and rapid manner and which has a low weight.

The invention claimed is:

1. A system for processing two-dimensional workpieces, comprising:
   a) a transport device, wherein a tooling is fastened to the transport device,
   the tooling comprising a main body and a plurality of holding elements arranged on the main body, wherein the holding elements are movable relative to the main body independently of one another, wherein each of the holding elements is fastened in an end region of an arm, wherein
   the arms are movable passively relative to the main body along a linear movement path in a longitudinal extension of each particular arm and the tooling comprises, for each of the arms a fixing apparatus, by means of which a position of each particular arm along the movement path is fixable, and
   b) a setting unit separate from the tooling, the setting unit being for moving the arms of the tooling relative to the main body of the tooling, wherein the setting unit is arranged in a region of the system in which the tooling is movable by means of the transport device, wherein
      the setting unit comprises a plurality of linearly movable elements, wherein the tooling is positionable relative to the setting unit such that the linearly movable elements may cooperate at the same time with a plurality of the arms for the movement of said arms along the movement path in order to set the position of the holding elements of the tooling as a function of a geometry of the two-dimensional workpieces.

2. The system as claimed claim 1, wherein the fixing apparatuses are formed by clamping units.

3. The system as claimed in claim 1, wherein the main body is formed by a support beam, wherein the arms are movably mounted on the support beam.

4. The system as claimed in claim 3, wherein the arms and the support beam span a common plane.

5. The system as claimed in claim 4, wherein the linear movement paths of the arms are oriented parallel to one another.

6. The system as claimed in claim 3, wherein the linear movement paths of all of the arms are oriented perpendicular to a longitudinal extension of the support beam, wherein the arms intersect the support beam with their longitudinal extension.

7. The system as claimed in claim 1, wherein the arms are guided in plain bearings arranged on the main body.

8. The system as claimed in claim 1, wherein the holding elements are vacuum suction cups.

9. The system as claimed in claim 1, wherein the system comprises a preparation unit for the two-dimensional workpieces, and wherein the setting unit is integrated in the preparation unit.

10. The system as claimed in claim 8, wherein the holding elements have devices for spreading apart the workpieces to be prepared.

11. The system as claimed in claim 1, wherein the holding elements are movable relative to the respective arm from an active position into an inactive position.

12. The system as claimed in claim 11, wherein an adjusting unit is arranged on each of the arms in order to move the holding elements in a linear manner between the active and the inactive position.

13. The system as claimed in claim 12, wherein the adjusting unit comprises a single-acting pneumatic cylinder and a restoring device, in particular a spring-based restoring device.

14. A method for processing two-dimensional workpieces comprising the following steps:
   a) moving a tooling into an interactive position with a setting unit, wherein the tooling comprises holding elements which are passively movable along a linear movement path;
   b) setting the positions of the holding elements of the tooling by means of the setting unit as a function of the geometry of the two-dimensional workpieces to be processed, wherein a plurality of the holding elements are moved in a linear manner independently of one another by the interaction with a plurality of linearly movable elements of the setting unit along the movement path and after the movement has taken place a position of the holding element along the movement path is fixed by means of a fixing apparatus arranged on the tooling;
   c) picking up the two-dimensional workpieces to be processed, by means of the tooling.

15. The method as claimed in claim 14, comprising the following further step:
   e) spreading apart a plurality of workpieces by devices which are arranged on the movable elements of the setting unit.

16. The method as claimed in claim 14, comprising the following further step:
   f) receiving a contour of the two-dimensional workpiece to be processed, by means of the movable elements of the setting unit.

17. The method as claimed in claim 14, wherein in the interactive position the tooling and the setting unit are arranged relative to one another such that the movable elements of the setting unit are movable parallel to one another in the same plane in which the holding elements are linearly movable parallel to one another along the movement path.

18. The method as claimed in claim 14, comprising the following further step:
   d) deactivating holding elements of the tooling which are not required for picking up the two-dimensional workpieces to be processed.

* * * * *